Oct. 27, 1925.
C. O. BRANDELL
TILE MAKING MACHINE
Filed March 28, 1921     9 Sheets-Sheet 1
1,559,498
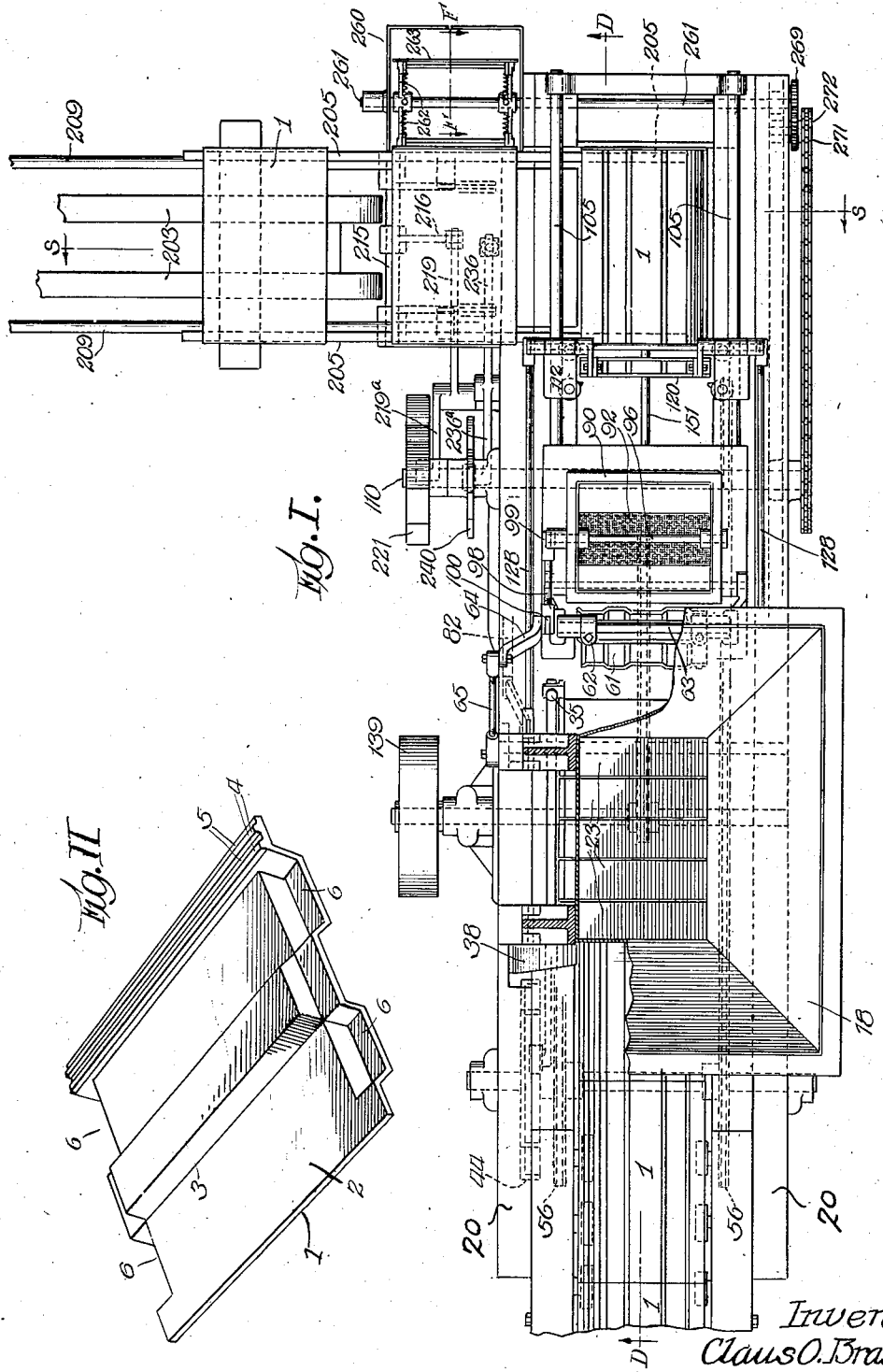
Inventor
Claus O. Brandell
By Sheridan, Jones, Sheridan & Smith attys.

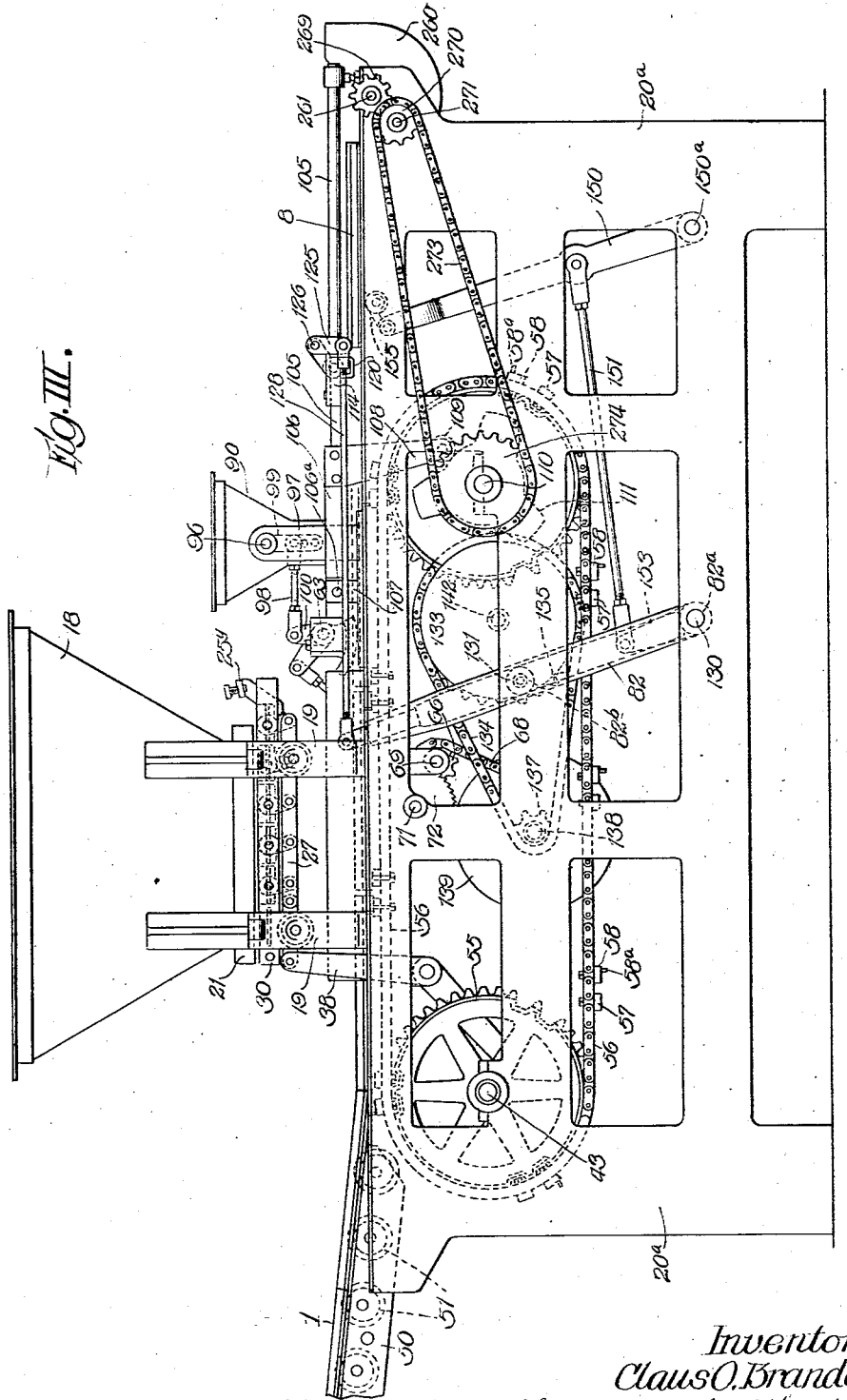

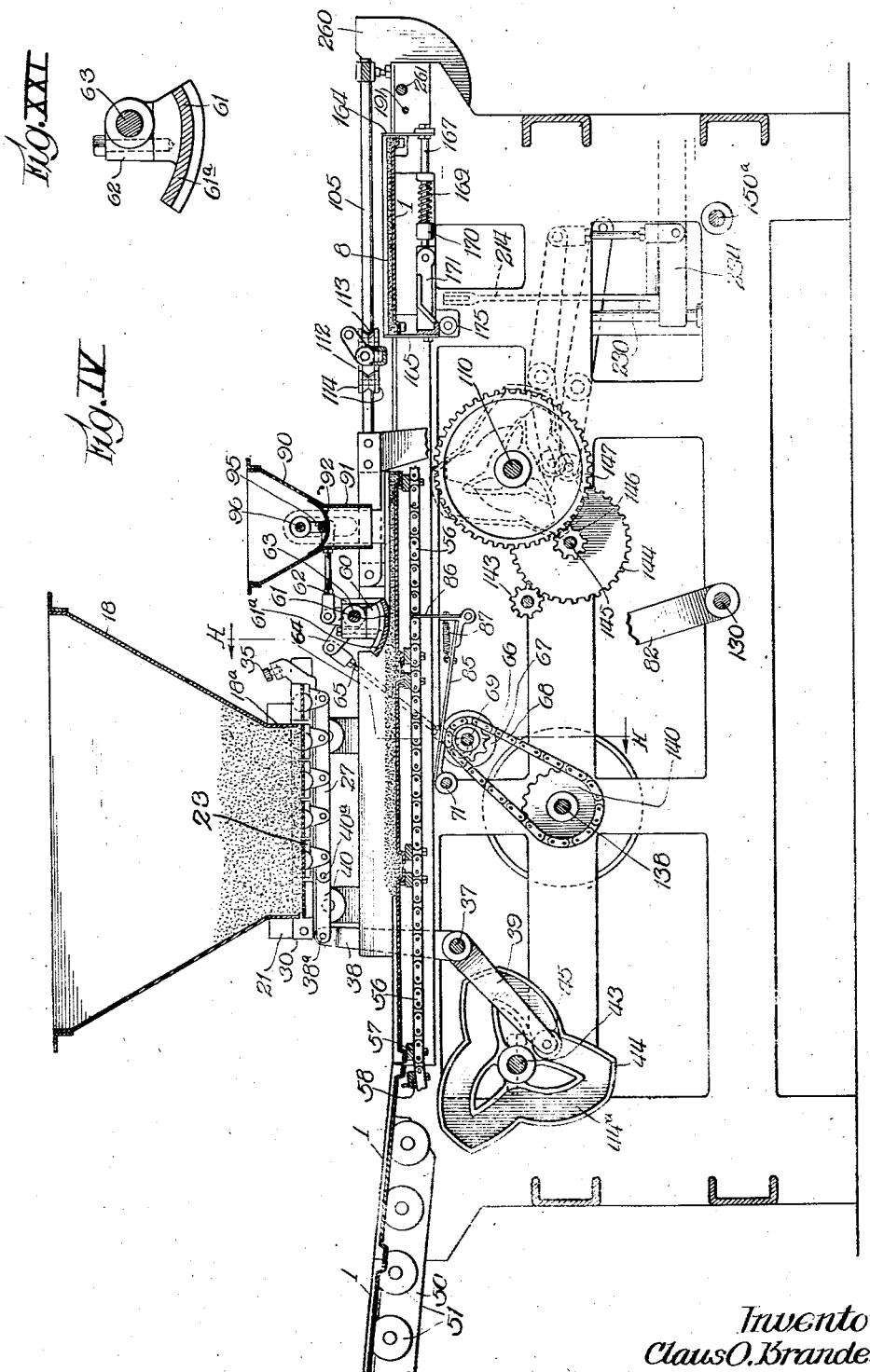

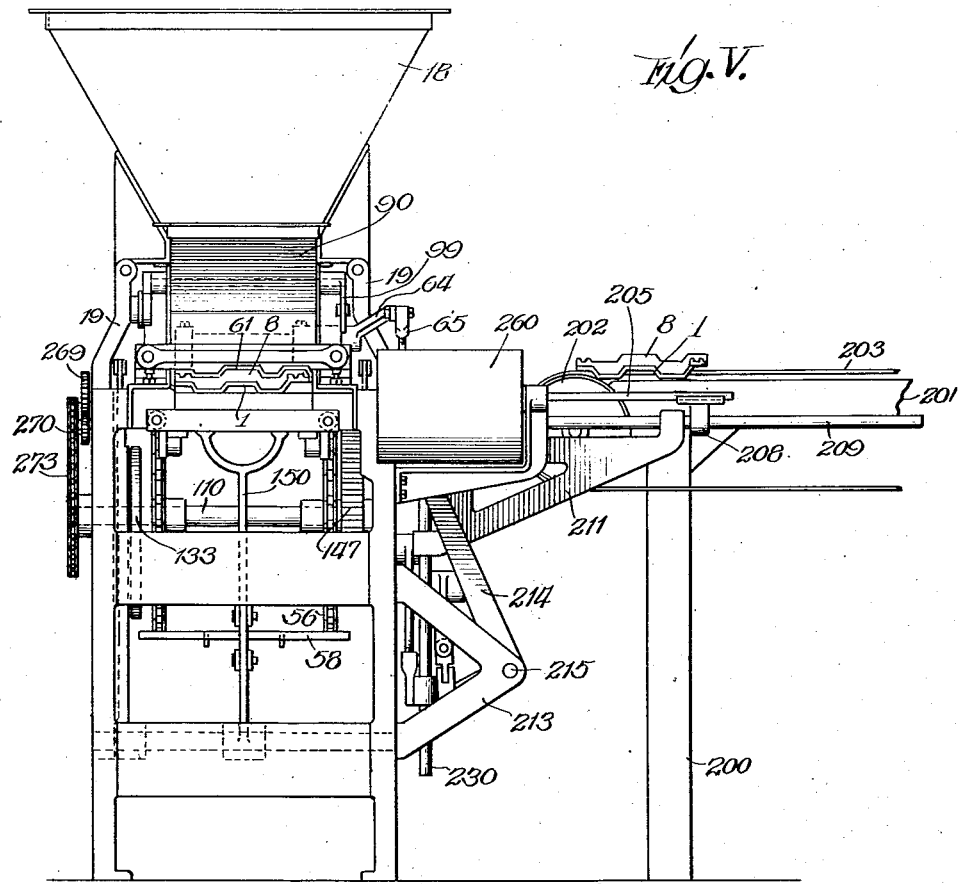

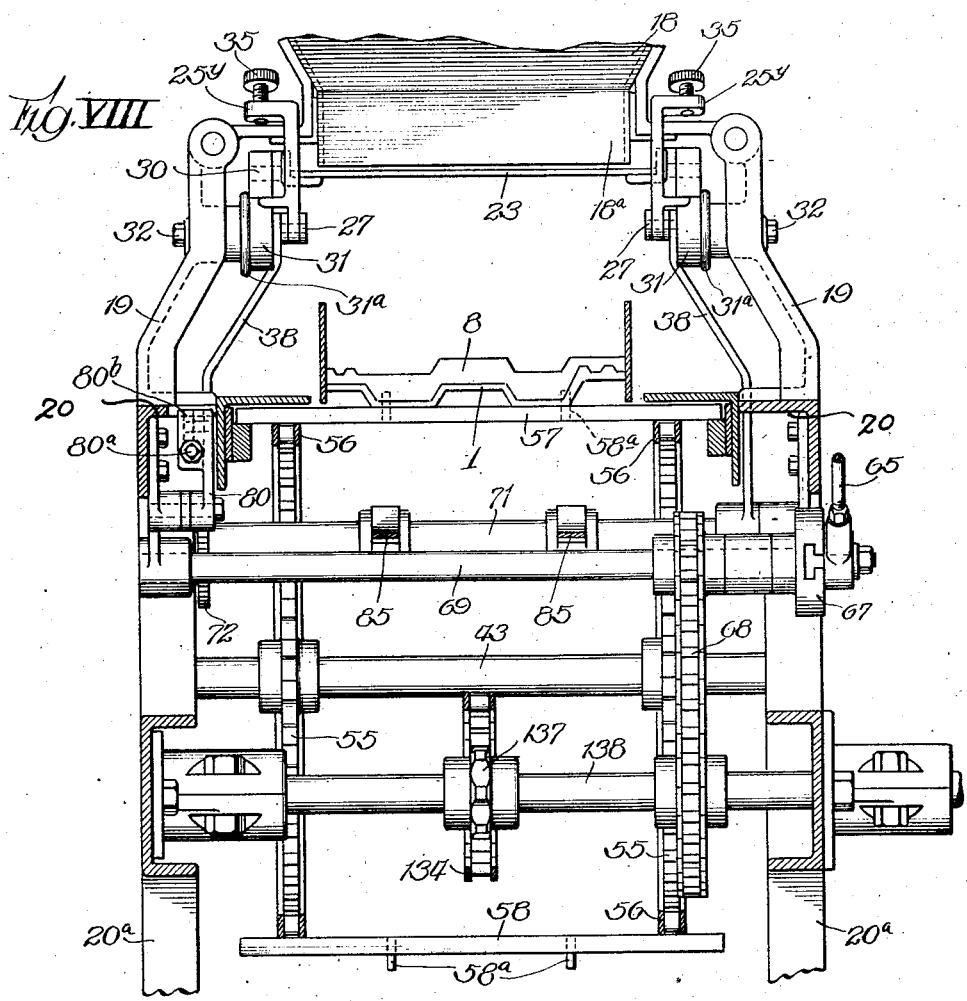
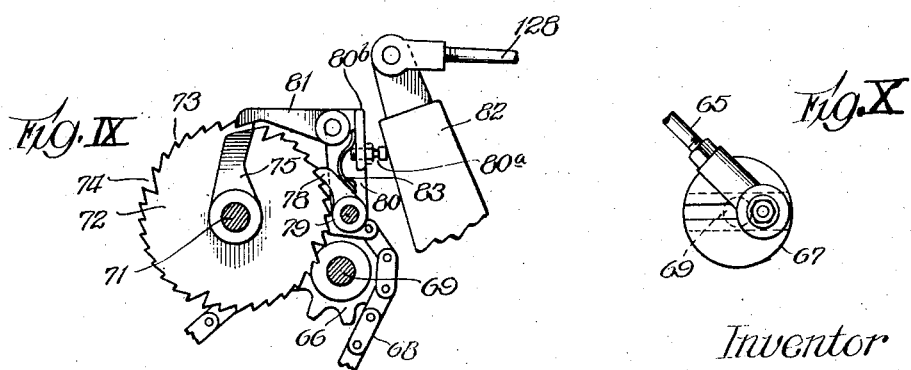

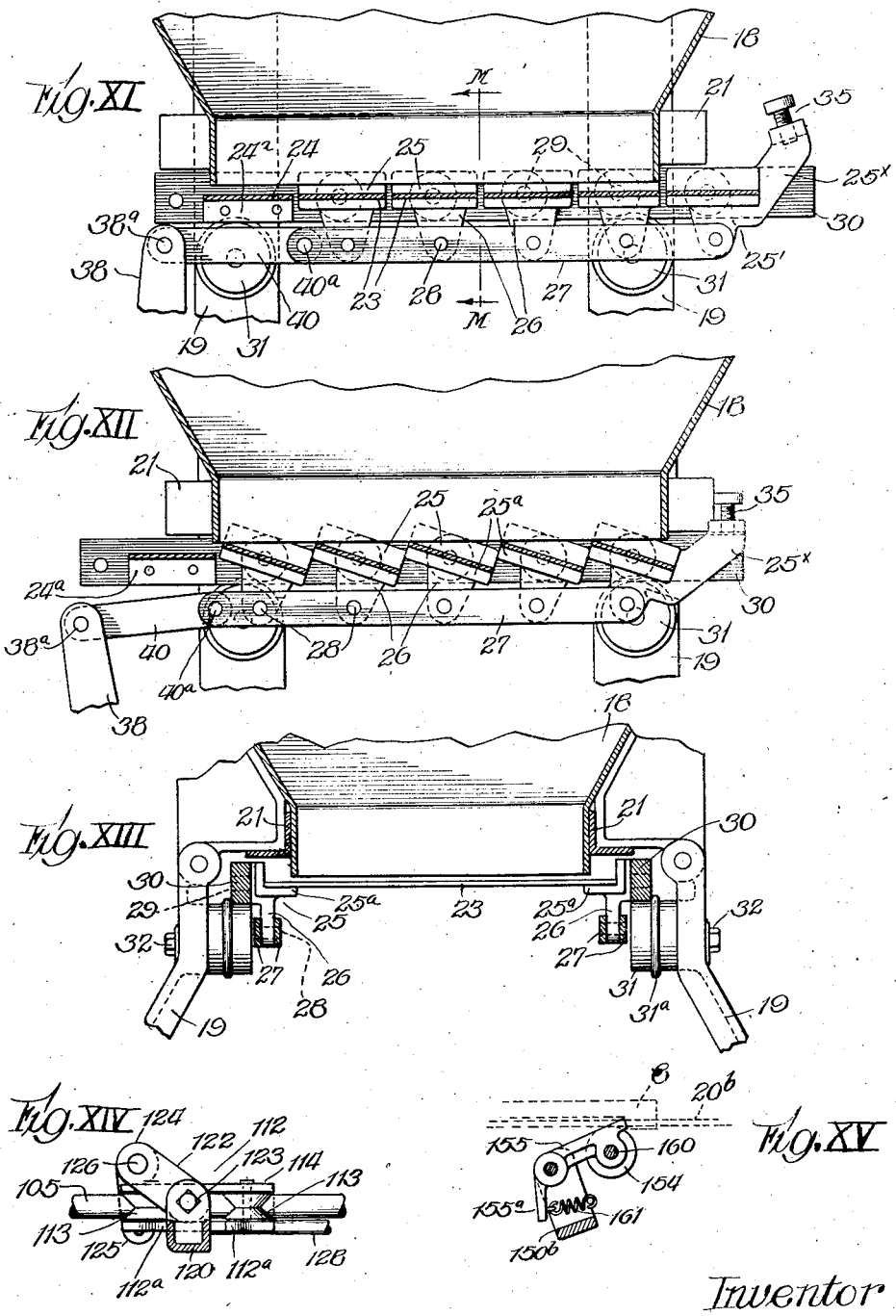

Oct. 27, 1925.
C. O. BRANDELL
TILE MAKING MACHINE
Filed March 28, 1921    9 Sheets-Sheet 7
1,559,498
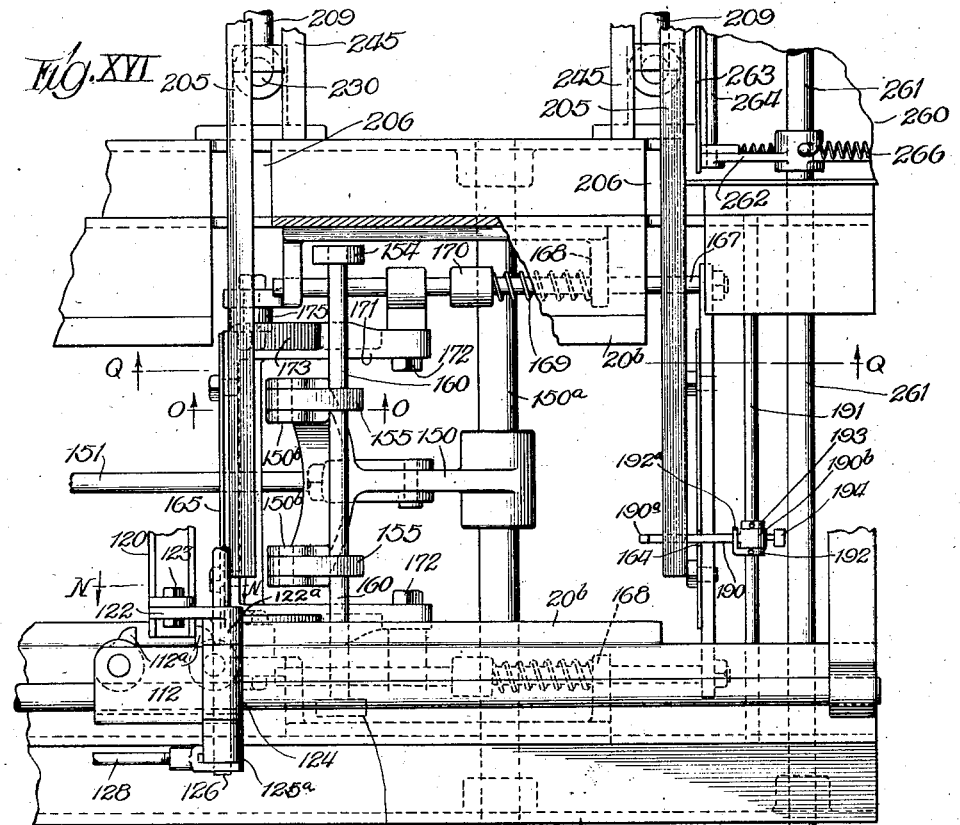
Inventor
Claus O. Brandell
By Sheridan Jones, Sheridan and Smith
Attys.

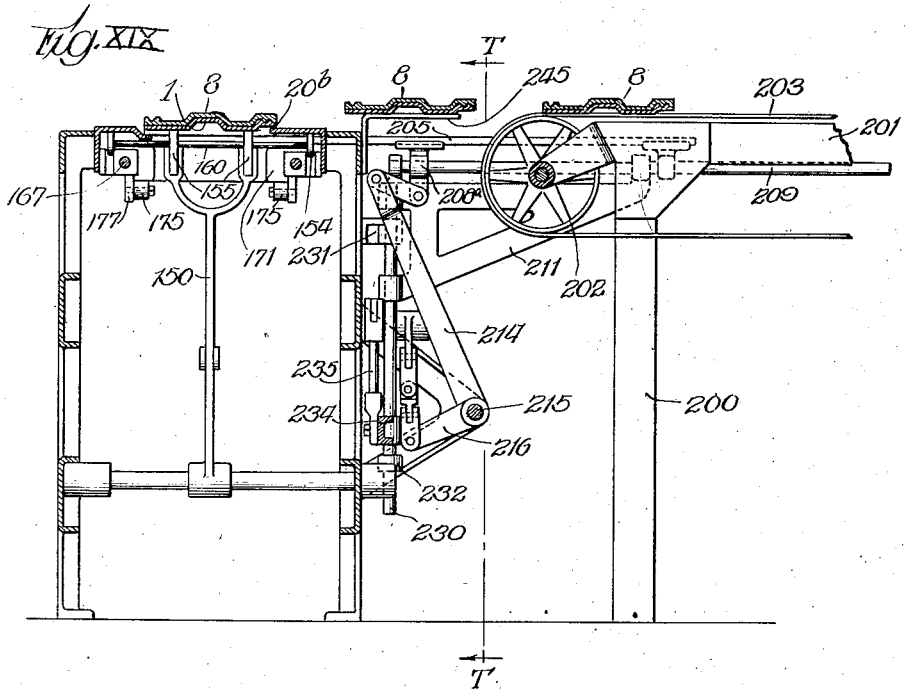
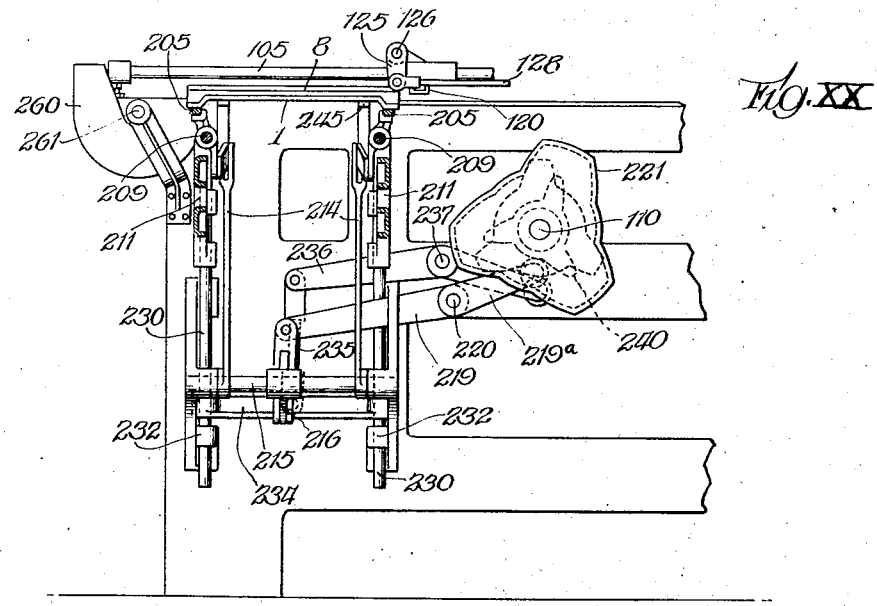

Oct. 27, 1925.
C. O. BRANDELL
TILE MAKING MACHINE
Filed March 28, 1921    9 Sheets-Sheet 9
1,559,498
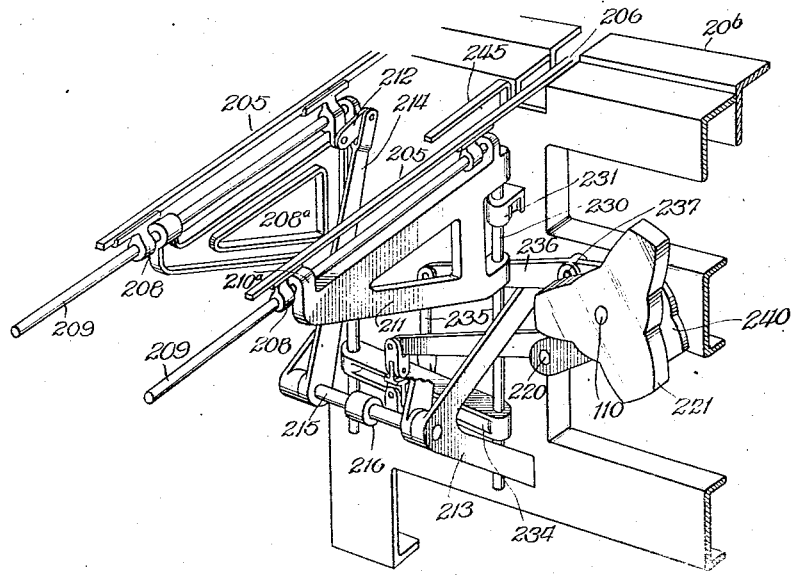
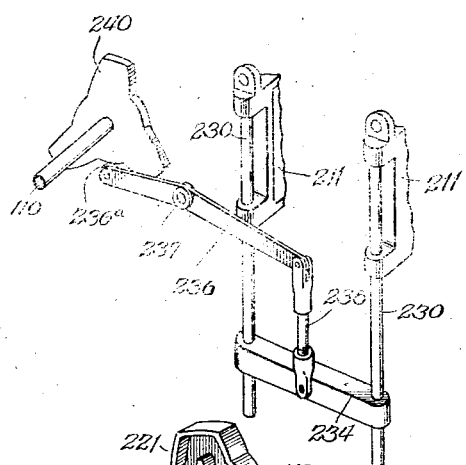
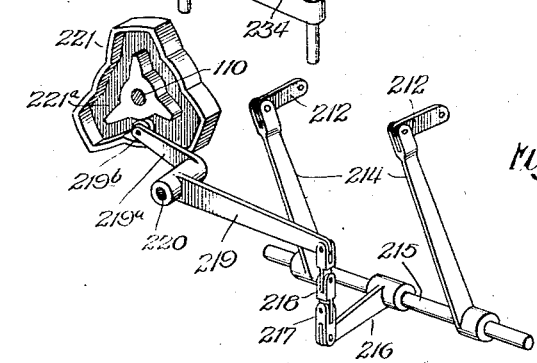
Inventor
Claus O. Brandell
By Sheridan, Jones, Sheridan & Smith
Attys.

Patented Oct. 27, 1925.

1,559,498

UNITED STATES PATENT OFFICE.

CLAUS O. BRANDELL, OF CHICAGO, ILLINOIS, ASSIGNOR OF ONE-HALF TO CARL A. CARLSON, OF CICERO, ILLINOIS.

TILE-MAKING MACHINE.

Application filed March 28, 1921. Serial No. 456,335.

*To all whom it may concern:*

Be it known that I, CLAUS O. BRANDELL, a citizen of the United States, residing at Chicago, in the county of Cook and State of Illinois, have invented certain new and useful Improvements in Tile-Making Machines, of which the following is a specification.

This invention relates to tile-making machines, and has for its object to provide a machine for making tile of concrete or the like, whereby the tile may be mechanically formed and colored without the necessity of manual treatment.

The object of my invention consists in the provision of mechanism of the type described above, wherein the constituent material will be automatically deposited upon pallet or mold boards in such manner as to enable it to be readily treated in subsequent operations, this delivery being made as the boards pass beneath the main supply.

Another object consists in the provision of means for tamping and preliminarily smoothing the upper portion of the material as the same is conveyed through the machine, this machine simulating the manual operations of present day tile-making, as will be more fully hereinafter described.

A further object consists in the provision of means for depositing coloring and finishing material on the upper suface of the partially formed tile during its progress.

Another object consists in the provision of automatic means for dividing adjacent tile as they travel through the machine.

Another object consists in the provision of means for automatically and efficiently controlling and finishing the upper surface of the tile, during which operation the same is maintained in fixed position.

Another object consists in the provision of means to position each tile and board during the trowelling operation, such means being operative to true up the ends of the tile.

Another object consists in the provision of means for removing and conveying each pallet board after the trowelling operation from the main portion of the machine transversely thereto.

Another object consists in the provision of means for coloring and finishing one end of each tile.

Still another object consists in the provision of inter-related driving and actuating means, or the means set forth above, whereby each of said means will function in proper co-relation and at the proper speed and time.

Other objects consist in the provision of means for carrying out the steps incident to the production of the completed tile.

These and other objects of the invention will be described in the following specification and shown in the accompanying drawings, in which—

Figure I is a plan view of an embodiment of my machine, a portion of the hopper being broken away for clearness;

Fig. II is a perspective view of one of the pallets or molding boards used with my machine;

Fig. III is a side elevation of the machine;

Fig. IV is a vertical longitudinal section, taken along the line D—D of Fig. I;

Fig. V is an end elevation of my machine;

Fig. VI is a vertical section of a detail of the mechanism, taken on the line F—F of Fig. I;

Fig. VII is a perspective view of a tile formed by my machine, a portion thereof being illustrated in section;

Fig. VIII is a vertical transverse section on the line H—H of Fig. IV;

Fig. IX is a detail of the actuating mechanism for the severing member;

Fig. X is a detail of the tamper-actuating means;

Fig. XI is a vertical longitudinal section through the hopper, showing the pivoted levers in closed position;

Fig. XII is a similar view, showing the levers in open or material-delivering position;

Fig. XIII is a vertical section, taken on the line M—M of Fig. XI;

Fig. XIV is a detail of the trowelling mechanism;

Fig. XV is a detail of the means for moving the pallet to trowelling position;

Fig. XVI is a plan view, on an enlarged scale, of the trowelling end of the machine;

Fig. XVII is a vertical section, taken on the line Q—Q of Fig. XVI, showing the means for positioning the pallet in trowelling position and for smoothing the ends of the tile;

Fig. XVIII is a view similar to Fig. XVII, showing the mechanism in another position;

Fig. XIX is a vertical transverse section on the line S—S of Fig. I;

Fig. XX is a vertical section on the line T—T of Fig. XIX;

Fig. XXI is a vertical section, drawn to an enlarged scale, of the tamping member;

Fig. XXII is a perspective detail of the mechanism for removing each pallet from the main table of the machine transverse thereto;

Fig. XXIII is a detail perspective view of a portion of the mechanism—shown in Fig. XXII—which actuates the conveying mechanism vertically; and Fig. XXIV is a similar detail, showing the means for actuating the transverse conveying mechanism laterally.

Like numerals refer to like elements throughout the drawings, in which—

1 designates the form of pallet or molding board shown in Fig. II, it being understood that the design and form of this board may be varied to accord with the character of tile which it is desired to produce. This board is provided with the upper surface 2, the raised central rib 3, the tongue 4 at one side thereof to form the grooves 5, and recesses 6 on either side of the rib are provided at the ends of the board. In Fig. VII I have shown a tile 8 partially formed by the board described, the coaction of the mechanism with the board resulting in the completely formed tile having the central raised rib 9 and the raised rib 10 at one side, beneath which are provided the tongues 11, forming grooves 12 on the lower face of the tile, while at the other side are provided the tongues 13 spaced apart to form the groove 14, this construction permitting interlocking engagement of the tongues and grooves 11—12 of one tile with the tongues and groove 13—14 on the upper face of the adjacent tile when assembled in building operations or the like. At the ends of the tile 8 are provided the depending lugs 15, spaced apart to define a central recess 16, within which is intended to fit the central rib 9 of subjacent tile, similar recesses being provided at the sides of adjacent tile by the lugs 15 of such tiles, as will be readily understood. This tile is of conventional construction, and needs no further explanation herein.

The machine comprises a main hopper 18, tapering toward its bottom, or point of discharge, as shown in Fig. IV, for example. This hopper is located above the body of the machine, being supported upon suitable standards 19 projecting upwardly from and carried upon the table 20, in turn forming a part of and supported by the frame 20ᵃ—see Fig. III. The hopper 18 is provided with the rectangular portion 18ᵃ at its bottom, which is open. A surrounding collar 21 serves to strengthen and support the rectangular portion 18ᵃ of the hopper 18.

Located at the bottom of the hopper, and normally affording a closure therefor, is a plurality of louvers 23,—see Figs. VIII and XI, for example. There is also provided one stationary louver 24, for a purpose described below. Each of the louvers 23 is carried upon and between a pair of brackets 25, having table portions 25ᵃ for that purpose. Each of the brackets is further provided with a depending lug or arm 26, these arms being pivotally held between straps 27, rivets or pins 28 serving to hold them in pivoted relation. At their outer portion the brackets are provided with circular bosses 28, carrying the trunnions 29, which are journalled in the reciprocating plates 30. Rollers 31 are supported on suitable bolt pins 32 projecting inwardly from the upright supports 19—see Fig. XIII, for example. These rollers are flanged at 31ᵃ, intermediate their extremities, to guide the plates 30 against lateral movement. The straps 27, brackets 25, and plates 30 form a reciprocating frame supported by the rollers 31. The rearmost bracket 25' is similar to the brackets 25, save that it is provided with an additional upwardly and outwardly extending arm 25ˣ, which terminates in angularly disposed extremity 25ʸ—see Fig. VIII—normally lying above the plate 30. An adjusting screw 35 is threaded into the extremity 25ʸ, for a purpose to be hereinafter described. The fixed lever 24 is provided with right angularly bent end portions 24ᵃ which are directly secured, by rivets or the like, to the plates 30.

Extending between the sides of the machine, beneath the top thereof, is the rock shaft 37, to which is secured the upwardly extending lever 38 and the angularly disposed downwardly extending lever 39. At its upper end the lever 38 is pivoted at 38ᵃ to a link 40, which, in turn, is pivoted at its other end 40ᵃ between the ends of straps 27—see Figs. IV and XII. A rotatable or driven shaft 43 extends between the sides of the machine, and secured thereto is the cam wheel 44, having a cam groove 44ᵃ, in which rides a roller 45 carried by the lever 39. This construction is such that rotation of the shaft 43 results in the reciprocation of the lever 38 to and fro. When in normal or closing position the lever mechanism is as illustrated in Figs. IV and XI. Upon movement of the levers 38 to the left, the straps 27 will be shifted relative to the plates 30 until the adjusting screws 25 contact with the top of said plates, after which further lateral movement to the left will be transmitted to the plates and the louvers will also be shifted laterally in the position shown in Fig. XII. Assuming a mass of concrete of the proper consistency to have been placed in the hopper 18, the tilting of the louvers 23 will permit a partial movement of such concrete, and lateral shifting of the louvers in their tilted position will serve to cut strips or ribbons of the concrete from the main body, which will be deposited upon subjacent pallet boards, as shown in Fig. IV for example. The cam wheel 44 is so constructed and driven as to time this cutting and depositing of the concrete in proper co-relation with the coacting mechanism.

At the left of the machine is provided the inclined way 50, composed of a pair of inclined sides, upon which are journalled the rollers 51, constructed to support and permit passage of the empty pallet boards 1.

Carried by the rotating shaft 43 is a pair of sprocket wheels 55, shown, for example, in Fig. III. A pair of chains 56 extend around and engage the sprockets 55 and also serve to transmit rotation thereto. At intervals corresponding to the length of the pallet boards 1 are provided the blank strips 57 and the feed strips 58, these strips being arranged in pairs and alternately, as illustrated in Fig. III the members of each pair being slightly spaced apart. The feeding strips differ from the blank strips only in that they are provided with engaging projections 58ª arranged to engage the depressed ends 6 of the pallet boards, as indicated in Fig. IV. Assuming the upper run of chain 56 to be moving from left to right as viewed in Fig. IV and a supply of empty boards 1 to be on the runway 50, the first of such boards will be engaged by a pair of feeding strips 58 and drawn upon the chain 56 until the depressed portions of the board at its other end are supported by the blank strip following, these strips serving to support the pallet board in the proper position above the chain, as shown in Fig. IV.

At the right of the hopper, as viewed in Fig. IV, for example, is provided a tamping or packing member 60, comprising the arcuate face portion 61 secured to the blocks 62, which, in turn, are carried upon the rock shaft 63. The shaft 63 is suitably journalled at the sides of the machine. The face 61 is properly grooved to conform to the upper surface of the tile to be formed, as will be obvious, and the arc of the forward portion 61ª is of flatter construction. An arm 64 projects from the shaft 63. An operating rod 65 is pivotally attached to the arm 64 at one end, and at its other end is eccentrically and pivotally attached to the block 67 and rotated by means of the chain 68 engaging the pinion 66, this pinion being carried on the shaft 69 (see Fig. IV) and also on the block 67 (see Fig. X). The pinion is rotated at a comparatively rapid rate, whereby the tamping member 60 is rapidly oscillated. This tamping member is so located that its lower face is spaced the desired thickness of the tile above the passing pallet boards, and during these oscillations the heaped up concrete or other material is quickly and efficiently tamped or patted to perform this operation, closely simulating the hand operation of tamping, and forming a vital portion of my machine. The character of the patting or tamping results in increasing the fluidity of the material and ensures its proper solidification and formation. As the tile passes beneath the tamper the central portion, i. e. the portion of greater curvature, being a proper distance above the mold board and partially rotating about its center, serves to rub and partially finish the upper surface of the tile as well as properly dimension it as to thickness.

To sever each tile from the succeeding tiles, I provide the following mechanism: A rotatable shaft 71 is provided, upon which is rotatably mounted a toothed ratchet wheel 72 having a plurality of shallow teeth 73, with tapered teeth 74 located at predetermined intervals. A pawl 75 is secured to the shaft 71, having its engaging tip so located as to lie just beneath the depressions of the shallow teeth 73, but above the deep depressions 74. A detent 78, mounted upon a suitable rod or shaft 79, normally engages the teeth of the ratchet 72, to prevent reverse rotation thereof. Also carried upon the shaft 79 is the oscillating arm 80, carrying a horizontal pawl 81 in engagement with the teeth of the ratchet 72—see Fig. IX. This arm is provided with an adjustable set screw 80ª, which at regular intervals is struck by a reciprocating lever 82, functioning to operate another portion of the mechanism described later. The spring 83, carried by the pawl 78, contacts with the flange 80ᵇ on the arm 80, and serves to return said arm normally after each movement of the lever 82. When the latter strikes the set screw 80ª it will move the arm 80 and pawl 81 to the left, as viewed in Fig. IX, a desired distance, this distance being regulable by adjustment of the set screw. When the pawl 81 is in engagement with one of the shallow depressions in the ratchet 72 it will ride over the pawl 75, but when it drops into one of the deeper depressions 74 it will engage the pawl 75 and will rock the shaft 71 during its movement. Secured to the shaft 71 is the arm 85, carrying at its outer extremity the pivoted knife 86, normally in vertical position and maintained therein by means of the coil spring 87 extending between the cutter or knife 86 on the arm 85. The knife is arranged to be projected between adjacent pallet boards on the chain 56, and they will permit such chain to travel by, due to the spring 87. Upon each engagement and movement of the pawl 75 the shaft 71 will be oscillated a sufficient amount to pass the knife 86 quickly between a pair of progressing pallet boards and the strips at such points, thereby cutting or severing the tile on one board from that on the succeeding board. Since the chain 56 and strips 57 and 58 are slowly travelling during this movement, some relief for the knife 86 must be provided, and this is done by the provision of springs 87, it being understood that the cutting movement of the knife is comparatively rapid.

After the proper tamping and formation of the tile, the same passes beneath the hopper 90, which is provided with a discharge spout 91, a screen 92 being located at the top of the spout. In the hopper is maintained a supply of coloring pigment and cement, these ingredients sifting through the screen upon the moist upper surface of the tile to impart a desired color and smooth exterior thereto. Located in the hopper 90 is the stirring or agitating arm 95, carried by the shaft 96, which is journalled in suitable standards 97 at the side of the hopper. Oscillation is imparted to the stirring arm 95 by means of the rod 98, attached to the arm 99 on the shaft 96—see Fig. III—and also attached to an arm 100 carried upon the shaft 63, the oscillation of the latter being thereby constantly transmitted to the stirring member 95 to clear the screen or sifter 92. After the passage of each tile and mold board beneath the hopper 90, I subject the former to a trowelling or finishing operation, which is performed by the following mechanism: A pair of rods 105 are located one on each side of the machine, being each secured at one end to side frame members 106, which in turn, are pivoted at their opposite ends 106ᵃ to supports 107 extending upwardly from the top of the machine. Projecting downward from and secured to the side frame members 106 is the leg 108, which is provided with a roller 109 at its lower end. Carried by the rotatable shaft 110 is the cam 111, which coacts with the roller 109 to tilt, at predetermined intervals, the said frame members and rods 105 about the pivotal points 106ᵃ. Upon each of the rods 105 is mounted the carriage 112, comprising two pairs of grooved rollers 113 engaging the rods and slidable thereon, these rollers being held between the plates 114—see Figs. IV and XIV. The trowel member proper is indicated by numeral 120, and is properly shaped on its under surface to conform to the longitudinal depressions of the tile. The trowel member is located between the carriage members 112, as shown in Fig. XVI; for example, being carried by the arms 122, to which it is bolted by bolts 123—see Fig. XVI, these bolts permitting adjustment of the trowel. These arms 122 are provided with the hub portions 122ᵃ, which fit on and are secured to the cross rod 126 extending across the machine. The upper carriage plates 114 are provided with bearings 124 in which is journalled the rod 126, the latter extending through said bearings. At the ends of the rod 126 are attached the hub portions 125ᵃ (see Fig. XVI) of arms 125, which are thus secured to the rod. These arms are pivotally engaged at their other ends by operating rods 128.

It will be obvious that longitudinal movement of the rods 128 will tend to rotate the arms 122 and trowel 120. This rotation is limited to a slight movement by means of the lugs 112ᵃ of the lower carriage plate 114 of the carriages 112, the purpose being that when the trowel is moving in its trowelling stroke it will be brought to bear upon the concrete, whereas on its return stroke it will be slightly lifted therefrom. The rod 128 is pivotally attached to the lever 82—see Fig. III—which latter is pivoted at its other extremity at 82ᵃ adjacent the base of the machine, being secured to and rotatable with the rock shaft 130. Intermediate its extremities the lever 82 is grooved at 82ᵇ, and in this groove rides the roller 131 eccentrically carried by the rotatable disk 133, which is rotated by the chain 134 and sprocket 135.

It will be obvious that the levers 82 oscillate back and forth, regardless of the position of the rods 105, the tilting of which latter is timed to permit movement of the pallet boards to trowelling position. The chain 134 is driven by the pinion 137 and drive shaft 138, to which rotation is imparted by the pulley 139, or the like. This shaft also carries the sprocket 140, engaging the chain 68. Rotation is transmitted from the sprocket 133 through shaft 142 and pinion 143 to gear 144, mounted on the shaft 145, on which is also mounted the pinion 146 which transmits rotation to the gear 147, carried by the shaft 110.

I provide for positive movement of the mold boards from the chain 56 to trowelling position in the following manner: A rocking lever 150 is pivoted at its lower extremity at 150ᵃ. An operating rod 151 is pivotally attached to lever 150 intermediate the extremities of the latter. At its other end this operating rod is pivoted to the arm 153, carried by the shaft 130—see Fig. III—so that the lever 150 will operate in synchronism with lever 82. The actuating wheel 133 rotates at a speed sufficient relative to the other mechanism to accomplish two or more trowelling strokes on each tile, the movement of the lever 150 being functionless during such trowelling strokes. It will be obvious that the speed of the driving wheel 133 may be varied to accomplish any desired number of trowelling operations for each tile. At its upper extremity the lever 150 is bifurcated at 150ᵇ—see Fig. XVI—each of the ends of the bifurcated portion being split, and between each pair of extremities thus formed is pivoted the engaging arm 155, carrying the rollers 154, normally riding against the lower side of the flanges of table 20. The rollers 154 are carried on a rod 160, which extends through the pivoted pawls 155, as shown in Fig. XVI, for example. A spring 161 extends between each end 150ᵇ of the lever 150 and the angularly bent portion 155ᵃ of the pivoted arm, this spring normally functioning to hold the arm in position to engage a pawl lug.

To position the tile properly during the trowelling operation, and to shape the ends thereof, I provide the following mechanism shown on an enlarged scale in Figs. XVI, XVII, and XVIII. A pair of spaced upright plates 164 and 165 are provided, the former being fixedly held against the cross strap 166, through which extends and is secured a pair of rods 167. These rods are slidably mounted in the brackets 168 and collar 170, carried on the rods 167. Arms 171 are pivoted on the bolts 172, which, in turn, are secured in bosses 173 carried by the rods 167. The outer ends of the arms 171 are secured to the plate 165 by bolts 165ᵃ or the like. The arms 171 are provided with flanges 173, which are inclined at 173ᵃ, thus forming a track or runway terminating in the offset portion 173ᵇ. Rollers 175 are secured by bolts 176 to lugs 177 carried by the frame of the machine.

Prior to the movement of the pallet board by the lever 150 the positioning and end shaping mechanism is in the position shown in Fig. XVIII. As the pallet board—indicated in dotted lines in said figure—is moved to the right, it strikes the plate 164, shaping the soft concrete or other material to form a smooth surface. The rods 167 are moved to the right with plate 164, compressing the spring 169. At the same time the arms 171 ride upwardly upon the rollers 175 to the position shown in Fig. XVII, wherein the plate 165 contacts and smooths the end of the tile and maintains it in position during the trowelling operation.

During its movement from the conveyor to trowelling position the pallet rides at its sides upon the horizontal flanges 20ᵇ, and by properly dimensioning and constructing the springs 169 the frictional resistance of the tile and board will ordinarily serve to maintain the plates 164 and 165 in the position shown in Fig. XVII during the trowelling operation. To ensure against possible displacement by the compressed springs 169, however, I have illustrated in Fig. XVI a latching means comprising a latch 190, having an upturned engaging end 190ᵃ, over which will ride a depressed portion 6 of the board 1 in its movement to trowelling position. The latch 190 is provided with a hub 190ᵇ rotatably mounted on the cross rod 191 between fixed collars 192 and 193. A counterweight 194 extends rearwardly of the hub, and serves to maintain the latch normally in engaging position. A transverse arm 192ᵃ extends angularly from the collar 192 and overlies the latch arm 190, serving to limit the upward movement thereof and prevent its interference with the lifting and transverse conveyance of the pallet board hereinafter described. The plate 164 is provided with a slot 164ᵃ, to permit extension therethrough of the latch arm.

After the completion of the trowelling operation, means are provided for transversely removing the pallet and tile in the following manner,—see Fig. V. Uprights 200 support the transverse frame members, constituting a transverse table 201, and between such members are located the rotating pulleys 202 rotating with and carrying the belts 203, the upper runs of which are located above the plane of the table 201. A pair of transverse spaced bars 205 are provided extending partially across the main table 20, the side members of the latter and the flanges 20ᵇ being recessed or cut away, as indicated at 206, to permit the extension therethrough of the bars 205—see Figs. I and XXII. These bars are normally below the plane of the pallet boards, and are supported upon pedestals 208, in turn carried upon subjacent rods 209—see Fig. V. Each of these rods extends through and is supported by the lugs 210ᵃ of the transverse triangular brackets 211. The pedestals 208 are slidable upon the rods 209, and one of each set thereof is provided with a depending lug 208ᵃ—see Fig. XXII. A link 212 is pivoted at one extremity to the lug 208ᵃ and at its other extremity between the ends of the bifurcated lever 214, which, in turn, at its extremity is secured to the rod 215. Likewise secured to the rod 215 is a crank 216, to the other end of which is pivotally attached the link 217, in turn pivotally attached through the link mechanism to the lever 219,—see Fig. XXIV, for example. This lever is carried by and rotatable with the rod 220, which is journalled in the side frame of the main portion of the machine. The lever 219 is provided with a rearwardly extending arm 219ᵃ which carries a roller 219ᵇ riding in the cam groove 220ᵃ of the cam 221, which is carried upon and rotated by the shaft 110. It will be obvious that actuation of the lever 219 by the cam 221 will result in a sliding of the bars 205 laterally and transversely of the main table of the machine. The rod 215 is suitably journalled in triangular brackets 213 extending outwardly from the main frame of the machine, see Fig. XXII for example.

The brackets 211 are carried by the vertical rods 230, which are journalled in bearings 231 and 232 for vertical movement. A cross bar 234 extends between and connects the rods 230. A link 235 is pivotally attached to the cross bar 234 at one extremity, and at its other extremity is pivotally attached to the lever 236, pivotally mounted upon a rod at 237 carried by the main frame of the machine, see Figs. XXII and XXIII. At one end the lever carries a roller 236$^a$, which is attached at the under side of a cam disk 240 carried upon the shaft 110 and so constructed as to reciprocate the rods 230 vertically, and thereby the brackets 211. This vertical movement is transmitted to the bars 205, and the resultant of the two motions by proper construction of the cam and disk is a substantially rectangular or elliptical one, by which the bars are moved transversely beneath the pallet board on the flanges 20$^b$, thereafter engaging the pallet and tile and moving the same transversely of the main frame of the machine. Prior to the movement of the bars 205 to the left, as viewed in Fig. XXII, they are first lifted, as will be obvious, and the lever 214 will exert a substantially axial thrust on the link 212. Thereafter the bars move downwardly, depositing the pallet upon the shelf strips 245 carried by the main frame of the machine—see Figs. VI and XXII. In the next cycle the bars will engage the pallet previously deposited upon the shelf strips and advance the same further, depositing it upon the belts 203, after which it is conveyed to any suitable place for collection.

During the support of each pallet and tile upon the shelf strips 245, means are actuated to color one end of the tile, i. e. that end which is exposed in use. This is accomplished by the mechanism shown, for example in Fig. VI, consisting of a liquid pigment tank 260—see also Figs. I and IV—this tank being supported on the transverse frame of the machine.

A rotatable shaft 261 extends across the tank 260 and carries a pair of arms 262, each extending at either side of the shaft. At the outer extremities of each of these arms is located a pedal or blade 263 right angularly disposed with respect to the carrying arms 262, to which it is pivotally attached by trunnions 264. Arms 263$^a$ extend outwardly from the pedal, and coiled springs 266 extend between these arms and set screws 267 carried by the arms 262, as shown in Fig. VI. At the outer end of the shaft 261 is provided a pinion 269 in mesh with a gear 270 carried upon the shaft 271, which also carries a sprocket 272 actuated by the chain 273, driven from the sprocket 274 and shaft 110—see Figs. I and III. In this manner rotation is transmitted to the shaft 261 in the direction of the arrows, as shown in Fig. VI. The blades or pedals are so located that after dipping into the fluid pigment in the tank 260 they will wipe or rub the adjacent end of the tile, the springs 266 permitting of slight yielding during this movement, whereby one end of the tile is not only colored but is smoothed, this being the end exposed in use.

It is believed that the description of the various parts and elements has been sufficiently outlined to enable those skilled in the art to understand the operation of the mechanism; and it is therefore not believed to be necessary to describe the operation of the machine in detail here.

It will be understood that my invention is susceptible of numerous modifications and alterations; and I do not therefore wish to be restricted to the form shown, except as defined in the appended claims.

I claim:—

1. In mechanism of the class described, a substantially horizontal table comprising spaced side members, endless conveyor mechanism located between said side members, and inclined side members forming an inclined guideway extending forwardly of said side members and constructed and arranged to deliver a pallet board to said conveying mechanism.

2. In mechanism of the class described, a substantially horizontal table comprising spaced side members, endless conveyor mechanism located between said side members, and inclined side members forming an inclined guideway extending forwardly of said side members and constructed and arranged to deliver a pallet board to said conveying mechanism, said guideway being provided with rollers to expedite such delivery.

3. In mechanism of the class described, a material container, means to pass a mold therebeneath, and intermittently actuated means to deposit a charge of material automatically from said container upon said mold over substantially the entire area thereof.

4. In mechanism of the class described, a material container, means to pass a mold therebeneath, and means to deposit a charge of material automatically from said container upon said mold over substantially the entire area thereof, said last-named means comprising a reciprocating member.

5. In mechanism of the class described, a material container, means to pass a mold therebeneath, said container being provided with a discharge opening adjacent said means, tiltable louvers normally closing said outlet, and means to move and tilt said louvers laterally.

6. In mechanism of the class described, a material container, means to convey a mold therebeneath, and means to deposit a charge of material automatically from said container upon said mold, said last-named means comprising a reciprocating member, said member being provided with a plurality of tiltable louvers.

7. In mechanism of the class described, a material container, means to pass a mold therebeneath, means to deposit a charge of material automatically from said container upon said mold, said last-named means comprising a reciprocating member, and means to reciprocate said member, said last-named means comprising a rockable lever and a rotatable cam member coacting therewith.

8. In a machine of the class described, a material container, a reciprocable member located adjacent the outlet thereof, said member comprising sides, and tiltable louvers journalled in said sides.

9. In a machine of the class described, a material container, a reciprocable member located adjacent the outlet thereof, said member comprising sides, tiltable louvers journalled in said sides, said louvers being provided with engageable portions, a strap attached to said portions, and an oscillatable lever in engagement with said strap.

10. In a machine of the class described, a material container, a reciprocable member located adjacent the outlet thereof, said member comprising sides, tiltable louvers journalled in said side members, said louvers being provided with engageable portions, a strap attached to said portions, an oscillatable lever in engagement with said strap, and means to limit tilting of said louvers.

11. In a machine of the class described, a material container, a reciprocable member located adjacent the outlet thereof, said member comprising side members, tiltable louvers journalled in said sides, said louvers being provided with engageable portions, a strap attached to said portions, an oscillatable lever in engagement with said strap, and means to limit the tilting of said louvers, said means comprising an arm having a portion overlying one of said sides.

12. In a machine of the class described, a material container, a reciprocable member located adjacent the outlet thereof, said member comprising sides, tiltable louvers journalled in said sides, said louvers being provided with engageable portions, a strap attached to said portions, an oscillatable lever in engagement with said strap, means to limit the tilting of said louvers, said means comprising an arm having a portion overlying one of said sides, and means carried by said overlying portion to permit regulation of the movement thereof.

13. In a machine of the class described, a material container having a discharge outlet, means associated with said outlet normally to close the same, said means comprising reciprocable plates, louvers journalled between said plates, said louvers being tiltable, and rollers supporting said plates and louvers.

14. In mechanism of the class described, a tamping member having an axis of rotation, a support therefor, said member being provided with a segmental cylindrical portion spaced from said center of rotation, its axis of evolution being coincident with said axis of rotation, and a relatively flattened portion merged with and extending substantially tangentially from said cylindrical portion.

15. In mechanism of the class described, material charging means, means to convey a pallet therebeneath for charging, means, subsequently operating upon material on said pallet to first pat the same to the desired thickness and subsequently rub the surface thereof.

16. In mechanism of the class described, in combination conveyor means constructed and arranged to convey a pallet, means to deposit material on said pallet, subsequently acting means comprising a tamping member located above said conveyor and oscillatable about an axis, said member being provided with a segmental cylindrical portion having its axis coincident with said axis of rotation, said portion being spaced from said concrete carrying means a distance equal to the thickness of the tile to be formed on said pallet, said tamping member being further provided with a relatively flattened portion merging with said cylindrical portion.

17. In mechanism of the class described, in combination conveyor means constructed and arranged to convey a pallet, means to deposit material on said pallet, subsequently acting means comprising a tamping member located above said conveyor and oscillatable about an axis, said member being provided with a segmental cylindrical portion having its axis coincident with said axis of rotation, said portion being spaced from said concrete carrying means a distance equal to the thickness of the tile to be formed on said pallet, said tamping member being further provided with a relatively flattened portion merging with said cylindrical portion, means to oscillate said tamping member whereby said flattened portion will first pat the material on a subjacent pallet to the desired thickness, and said cylindrical portion will subject it to an oscillatory rubbing.

18. In mechanism of the class described, a pallet-conveying and supporting means, a tamping member located thereabove, said tamping member comprising a curved portion and a relatively flattened portion said tamping member being rotatably mounted to oscillate about the center of curvature of said curved portion and being so arranged with respect to the direction of travel of said pallet-supporting means that said flattened portion will first exert a tamping action upon material carried by a pallet passing therebeneath and said curved portion will subsequently exert a rubbing or smoothing action upon such material.

19. In mechanism of the class described a pallet-conveying and supporting means, a tamping member overlying said means, a pigment container located rearwardly of said tamping member in the direction of travel of said supporting means, a stirrer coacting with said container, means to oscillate said tamping member, and means to oscillate said stirrer, said last-named means being operatively connected to said means for oscillating said tamping member.

20. In mechanism of the class described, pallet-supporting and conveying means, cutting mechanism, said cutting mechanism comprising a vertically movable blade, an arm carrying said blade, and means to oscillate said arm, said blade being pivotally attached to said arm.

21. In mechanism of the class described, pallet-supporting and conveying means, cutting mechanism, said cutting mechanism comprising a vertically movable blade, an arm carried by said blade, means to oscillate said arm, said blade being pivotally attached to said arm, and means to maintain said blade yieldingly in vertical position.

22. In mechanism of the class described, pallet-supporting and conveying means, cutting mechanism, said cutting mechanism comprising a vertically movable blade, an arm carried by said blade, means to oscillate said arm, said blade being pivotally attached to said arm, and means to maintain said blade yieldingly in vertical position, said last-named means comprising a spring extending between said blade and arm.

23. In mechanism of the class described, a cutting means comprising a blade, an oscillatable arm carrying said blade, a shaft carrying said arm, and means to rotate said shaft partially.

24. In mechanism of the class described, a cutting means comprising a blade, an oscillatable arm carrying said blade, a shaft carrying said arm, means to rotate said shaft partially comprising a ratchet wheel mounted in said shaft, a pawl carried by said shaft adjacent said wheel, and an operating pawl, said first-named pawl and ratchet wheel being so constructed and related as to permit engagement between said pawls at predetermined intervals.

25. In mechanism of the class described, a cutting means comprising a blade, an oscillatable arm carrying said blade, a shaft carrying said arm, means to rotate said shaft partially comprising a ratchet wheel mounted in said shaft, a pawl carried by said shaft adjacent said wheel, an operating pawl, means to reciprocate said operating pawl, said first-named pawl and ratchet wheel being provided with a plurality of relatively shallow notches and a plurailty of relatively deep notches spaced at predetermined intervals about its periphery, said first-named pawl being of such size and relation as to permit passage thereby of said operating pawl when the latter is in engagement with said shallow notches and to be engaged by said operating pawl when the latter engages said relatively deep notches.

26. In mechanism of the class described, pallet-supporting and conveying means comprising an endless chain, cutting means comprising an oscillatable arm and a cutting blade carried thereby, said arm being operable to advance said blade between a pair of pallets on said chain at relatively great speed.

27. In mechanism of the class described, pallet-supporting and conveying means comprising an endless chain, cutting means comprising an oscillatable arm, a cutting blade carried thereby, said arm being operable to advance said blade between a pair of pallets on said chain at relatively great speed, and means to permit yielding of said plate relative to said arm to accommodate the movement of said pallets.

28. In mechanism of the class described, pallet-supporting and conveying means comprising an endless chain, cutting means comprising an oscillatable arm, a cutting blade carried thereby, said arm being operable to advance said blade between a pair of pallets on said chain at relatively great speed, and means to permit yielding of said plate relative to said arm to accommodate the movement of said pallets, said means comprising a spring extending between said plate and said arm.

29. In mechanism of the class described, a pallet-supporting and conveying means comprising rotatable sprockets, chains extending therearound, and cross strips carried by and extending between said chains, said strips being arranged in pairs, the strips of each pair being spaced.

30. In mechanism of the class described, a pallet-supporting and conveying means comprising rotatable sprockets, chains extending therearound, and cross strips carried by and extending between said chains, said strips being arranged in pairs, the strips of each pair being spaced, one of each pair of strips being provided with pallet-engaging means.

31. In mechanism of the class described, trowelling means comprising supporting means, a carriage reciprocably mounted thereon, a trowel carried thereby, said trowel being provided with a substantially plane trowelling surface, means to reciprocate said carriage and trowel.

32. In mechanism of the class described, trowelling means comprising supporting means, a carriage reciprocably mounted thereon, a trowel carried thereby, said trowel being provided with a substantially plane trowelling surface, means to reciprocate said carriage and trowel, said trowel being mounted to tilt in one direction of movement.

33. In mechanism of the class described, trowelling means comprising supporting means, a carriage reciprocably mounted thereon, a trowel carried thereby, said trowel being provided with a substantially plane trowelling surface, means to reciprocate said carriage and trowel, said trowel being provided with a rounded corner.

34. In mechanism of the class described, an endless conveyor, supporting stationary means, and means to move a pallet from said conveyor to and upon said supporting means at a greater speed than that of said conveyor.

35. In mechanism of the class described, an endless conveyor, supporting stationary means, and means to move a pallet from said conveyor to and upon said supporting means at a greater speed than that of said conveyor, said means comprising an oscillatable lever.

36. In mechanism of the class described, pallet-supporting means, conveying means to convey the pallets to said supporting means, means to engage and move pallets to and upon said first-named supporting means, said engaging means comprising an oscillatable lever provided with a pivoted engaging arm at its extremity, and a spring operatively interposed between said lever and arm to engage the same yieldingly in engaging position.

37. In mechanism of the class described, pallet-supporting means, conveying means to convey the pallets to said supporting means, means to engage and move pallets upon said first-named supporting means, said engaging means comprising an oscillatable lever provided with a pivoted engaging arm at its extremity, a spring operatively interposed between said lever and arm to engage the same yieldingly in engaging position, and a roller carried by said arm.

38. In mechanism of the class described, pallet-engaging and advancing means comprising an oscillatable lever, said lever being bifurcated at one extremity, engaging arms pivotally attached to said bifurcated ends, and springs operatively interposed between said arms and lever to maintain the former yieldingly in engaging position.

39. In mechanism of the class described, pallet-engaging and advancing means comprising and oscillatable lever, said lever being bifurcated at one extremity, engaging arms pivotally attached to said bifurcated ends, springs operatively interposed between said arms and lever to engage the former yieldingly in engaging position, a rod carried by said arms, and rollers carried by said rod.

40. In a mechanism of the class described, pallet-engaging and advancing means, and pallet-positioning means comprising a pair of vertical plates, one of said plates being engageable by said pallet in its movement to position.

41. In mechanism of the class described, pallet-engaging and advancing means, pallet-positioning means comprising a pair of vertical plates, one of said plates being engageable by said pallet in its movement to position, and means to resist the movement of said plates.

42. In mechanism of the class described, pallet-engaging and advancing means, pallet-positioning means comprising a pair of vertical plates, one of said plates being engageable by said pallet in its movement to position, and means to resist the movement of said plates, said means comprising springs.

43. In mechanism of the class described, the combination with pallet-engaging and moving means of positioning means comprising a vertical plate, rods carrying said plate, means to support said rods, the latter being reciprocable in said means, a second plate, plate-carrying means suitably attached to said rods, said first-named plate being engageable by and movable with said pallet in its movement to position, and means to move said second plate and carrying means to position during such movement.

44. In mechanism of the class described, the combination with pallet-engaging and moving means of positioning means comprising a vertical plate, rods carried by said plate, means to support said rods, the latter being reciprocable in said means, a second plate, plate-carrying means suitably attached to said rods, said first-named plate being engageable by and movable with said pallet in its movement to position, and means to move said second plate and carrying means to position during such movement, said last-named means comprising a stationary roller and coacting guides carried by said plate-carrying means.

45. In mechanism of the class described, pallet-positioning means comprising a pair of reciprocable rods, a plate carried thereby, a second plate, means pivotally and operably attaching said second plate to said rods, and means coacting with said last-named means to move said second plate into positioning position during movement of said rods.

46. In mechanism of the class described, pallet-positioning means comprising a pair of reciprocable rods, a plate carried thereby, a second plate, means pivotally and operably attaching said second plate to said rods, means coacting with said last-named means to move said second plate into positioning position during movement of said rods, and means to resist said movement; said means comprising springs.

47. In mechanism of the class described, a pair of rods, a plate carried thereby, arms pivotally attached to said rods, a second plate carried by said arms, the latter being provided with inclined flanges, and rollers coacting with and supporting said flanges, said rollers and flanges being operative during the movement of said rods to move said arms and second-named plate in a substantially rectangular path.

48. In mechanism of the class described, a pair of reciprocable rods, a plate carried thereby, a second plate operatively attached to said rods, and a latch, one of said plates being slotted to permit the projection of said latch therethrough, said latch being pivoted to engage a pallet located between said plates.

49. In mechanism of the class described, a pair of reciprocable rods, a plate carried thereby, a second plate operatively attached to said rods, a latch, one of said plates being slotted to permit the projection of said latch therethrough, said latch being pivoted to engage a pallet located between said plates, and means to limit the pivotal movement of said latch.

50. In mechanism of the class described, a main table, a transverse table located adjacent thereto, pallet-supporting means associated with said main table adjacent said transverse table, and means to engage and remove a pallet from said supporting means to said transverse table.

51. In mechanism of the class described, a main table, a transverse table located adjacent thereto, pallet-supporting means associated with said main table adjacent said transverse table, means to engage and remove a pallet from said supporting means to said transverse table, said means comprising a pair of bars, and means to move said bars in a substantially rectangular path.

52. In mechanism of the class described, a main table, a transverse table located adjacent thereto, pallet-supporting means associated with said main table adjacent said transverse table, means to engage and remove a pallet from said supporting means to said transverse table, said means comprising a pair of bars, and means to move said bars in a substantially rectangular path, said first-named pallet-supporting means being recessed to permit such movement of said bars.

53. In mechanism of the class described, pallet-engaging bars, means to impart lateral and vertical movement to said bars, said last-named means comprising levers and coacting cams, and means operatively connecting said levers to said bars.

54. In mechanism of the class described, a pair of pallet-engaging bars, supporting members, pedestals carrying said bars and slidably mounted on said supporting members, and means to move said bars laterally, said means comprising an oscillatable lever operatively attached to one of said pedestals.

55. In mechanism of the class described, a pair of pallet-engaging bars, supporting members, pedestals carrying said bars and slidably mounted on said supporting members, means to move said bars laterally, said means comprising an oscillatable lever, and a link pivotally attached to said lever and pedestal.

56. In mechanism of the class described, a pair of pallet-engaging bars, supporting members, pedestals carrying said bars and slidably mounted on said supporting members, means to move said bars laterally, said means comprising an oscillatable lever, a link pivotally attached to said lever and pedestal, and means to impart vertical movement to said bars.

57. In mechanism of the class described, a pair of pallet-engaging bars, supporting members, pedestals carrying said bars and slidably mounted on said supporting members, means to move said bars laterally, said means comprising an oscillatable lever, a link pivotally attached to said lever and pedestal, and means to impart vertical movement to said bars, said last-named means comprising supporting members carrying said first-named supporting members and means to raise and lower said last-named supporting members.

58. In mechanism of the class described, a pair of pallet-engaging bars, supporting members, pedestals carrying said bars and slidably mounted on said supporting members, means to move said bars laterally, said means comprising an oscillatable lever, a link pivotally attached to said lever and pedestal, and means to impart vertical movement to said bars, said last-named means comprising supporting members carrying said first-named supporting members and means to raise and lower said last-named supporting members, said last-named means comprising a cam and lever mechanism actuated thereby.

59. In mechanism of the class described, a pair of supporting bars, rods located adjacent thereto, pedestals slidably mounted on said rods and supporting said bars, bracket members carrying said rods, means to raise and lower said bracket members, and means to move said pedestals laterally upon such rods.

60. In mechanism of the class described, a pair of supporting bars, a pair of rods, pedestals carrying said bars and slidably mounted upon said rods, a pair of vertical rods, a pair of brackets carried by said vertical rods, means to journal said vertical rods, a rockable lever, and means operatively connecting said lever to said vertical rods, said lever being in engagement with and actuated by a cam member.

61. In mechanism of the class described, a pair of supporting bars, a pair of rods, pedestals carrying said bars and slidably mounted upon said rods, a pair of vertical rods, a pair of brackets carried by said vertical rods, means to journal said vertical rods, a rockable lever, an oscillatable lever, said rockable lever being operatively connected to said oscillating lever, and a cam co-acting with said rockable lever to rock the same, said rocking movement imparting vertical movement to said first-named rods.

62. In mechanism of the class described, a pair of bars, means to impart substantial rectangular movement to said bars, shelf means located above the normal or rest position of said rods, and a rotatable paddle located adjacent said shelf members, said paddle being operable to wipe and color one end of a pallet and tile supported upon said shelf.

63. In mechanism of the class described, a pair of bars, means to impart substantial rectangular movement to said bars, shelf means located above the normal or rest position of said rods, a rotatable paddle located adjacent said shelf members, said paddle being operable to wipe and color one end of a pallet and tile supported upon said shelf, a rotatable shaft, and an arm carried thereby, said paddle being pivotally attached to said arm.

64. In mechansim of the class described, a pair of bars, means to impart substantial rectangular movement to said bars, shelf means located above the normal or rest position of said bars, a rotatable paddle located adjacent said shelf members, said paddle being operable to wipe and color one end of a pallet and tile supported upon said shelf, a rotatable shaft, an arm carried thereby, said paddle being pivotally attached to said arm, and a fluid pigment container located beneath said shaft.

65. In mechanism of the class described, pallet-supporting means, a pair of bars normally beneath the upper surface of said supporting means, means to impart a substantially rectangular movement to said bars, and shelf members located above the normal position of said bars, whereby a pallet board carried by said bars will be deposited on said shelf by said bars in their movement.

66. In mechanism of the class described, pallet-supporting means, a pair of bars normally beneath the upper surface of said supporting means, means to impart a substantially rectangular movement to said bars, shelf members located above the normal position of said bars, whereby a pallet board carried by said bars will be deposited on said shelf by said bars in their movement, and pallet-conveying means located adjacent said shelf members, said bars being further operative to remove a pallet from said shelf members and deposit the same upon such conveying means.

67. In mechanism of the class described, in combination pallet-supporting and conveying means, a material container located thereabove, means to discharge material from said container upon a pallet carried by said conveying means in its discharge therebeneath, tamping means located above said conveying means, a second container located above said conveying means, trowelling mechanism also located above said conveying means, all of said mechanisms being located in succession in the direction of travel of said conveying means, a fixed pallet support constructed and arranged to receive pallets from said conveying mechanism, and intermittently operating feeding means operable to move said pallets upon said fixed support.

68. In mechanism of the class described, in combination pallet-supporting and conveying means, a material container located thereabove, means to discharge material from said container upon a pallet carried by said conveying means in its discharge therebeneath, tamping means located above said conveying means, a second container located above said conveying means, trowelling mechanism also located above said conveying means, all of said mechanisms being located in succession in the direction of travel of said conveying means, a fixed pallet support constructed and arranged to receive pallets from said conveying mechanism, intermittently operating feeding means operable to move said pallets upon said fixed support, and means to engage and remove pallets transversely from said fixed support.

69. In mechanism of the class described, a table, pallet-supporting and conveying means mounted between the sides of said table, a material container located above and supported by said table, a tamping member carried by said table above said conveying means, said table being provided with a fixed supporting means constructed and arranged to receive a pallet from said conveying means, and trowelling mechanism actuatable to trowel a tile carried by a pallet upon said fixed supporting means.

70. In mechanism of the class described, a table, pallet-supporting and conveying means mounted between the sides of said table, a material container located above and supported by said table, a tamping member carried by said table above said conveying means, said table being provided with a fixed supporting means constructed and arranged to receive a pallet from said conveying means, trowelling mechanism actuatable to trowel a tile carried by a pallet upon said fixed supporting means, and means to engage and move said pallets upon said fixed support to trowelling position.

71. In mechanism of the class described, a table, pallet-supporting and conveying means mounted between the sides of said table, a material container located above and supported by said table, a tamping member carried by said table above said conveying means, said table being provided with a fixed supporting means constructed and arranged to receive a pallet from said conveying means, trowelling mechanism actuatable to trowel a tile carried by a pallet upon said fixed supporting means, means to engage and move said pallets upon said fixed support to trowelling position, and means to position said pallet accurately upon said fixed support for trowelling.

72. In mechanism of the class described, pallet-supporting means, trowelling mechanism located thereabove, means to move a pallet to trowelling position upon said supporting means, and means to remove a pallet subsequent to trowelling transversely of said supporting means.

In testimony whereof, I have subscribed my name.

CLAUS O. BRANDELL.